(12) United States Patent
Yamaguchi et al.

(10) Patent No.: US 8,294,931 B2
(45) Date of Patent: *Oct. 23, 2012

(54) CONTROLLING PROGRAM AND IMAGE FORMING APPARATUS

(75) Inventors: Yasuhiko Yamaguchi, Hino (JP); Tsuyoshi Yoneyama, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 1007 days.

This patent is subject to a terminal disclaimer.

(21) Appl. No.: 12/235,255

(22) Filed: Sep. 22, 2008

(65) Prior Publication Data

US 2009/0091786 A1    Apr. 9, 2009

(30) Foreign Application Priority Data

Oct. 5, 2007    (JP) ................. 2007-261852

(51) Int. Cl.
- *G06F 3/12* (2006.01)
- *G06K 15/00* (2006.01)
- *G06K 9/00* (2006.01)
- *G03F 3/08* (2006.01)
- *G09F 3/041* (2006.01)

(52) U.S. Cl. ............. 358/1.15; 358/1.18; 358/1.14; 358/518; 382/115; 345/173

(58) Field of Classification Search .......... 358/1.15, 358/1.18, 1.14; 345/173
See application file for complete search history.

(56) References Cited

U.S. PATENT DOCUMENTS

| | | | |
|---|---|---|---|
| 6,898,299 B1 * | 5/2005 | Brooks | 382/115 |
| 7,148,983 B2 * | 12/2006 | Goto | 358/1.15 |
| 7,349,115 B2 * | 3/2008 | Critelli et al. | 358/1.15 |
| 7,389,414 B2 * | 6/2008 | Hibino et al. | 713/161 |
| 7,904,915 B2 * | 3/2011 | Tanaka | 719/328 |
| 8,094,329 B2 * | 1/2012 | Hirama | 358/1.14 |
| 2002/0051259 A1 * | 5/2002 | Yasunobu | 358/518 |
| 2003/0020949 A1 * | 1/2003 | Goto | 358/1.15 |
| 2004/0181662 A1 * | 9/2004 | Kanai et al. | 713/155 |
| 2004/0263901 A1 * | 12/2004 | Critelli et al. | 358/1.15 |
| 2006/0149750 A1 * | 7/2006 | Tomita | 707/100 |
| 2007/0047505 A1 * | 3/2007 | Wassingbo | 370/338 |
| 2007/0273658 A1 * | 11/2007 | Yli-Nokari et al. | 345/173 |
| 2008/0117452 A1 * | 5/2008 | Murakami | 358/1.15 |

FOREIGN PATENT DOCUMENTS

JP    2009-094679    4/2009

\* cited by examiner

*Primary Examiner* — Akwasi M Sarpong
(74) *Attorney, Agent, or Firm* — Squire Sanders (US) LLP

(57) ABSTRACT

There is described a network system that includes a plurality of image forming apparatuses, which are coupled to each other through a network, and each of which makes it possible to output voice guidance from an image forming apparatus located in the vicinity of the specific user who has instructed any one of the other image forming apparatuses to implement a print job. Each of the plurality of image forming apparatuses includes: a communication section to bilaterally communicate information with other image forming apparatuses; an authenticating section to authenticate whether or not the specific user resides by the image forming apparatus concerned; and a voice outputting section to output the guidance for the specific user by emitting the audible voice; wherein, when the print job is suspended, select one of the image forming apparatus to carry the voice guidance to the specific user and output the guidance again.

15 Claims, 9 Drawing Sheets

CONTROLLING PROGRAM AND IMAGE FORMING APPARATUS

This application is based on Japanese Patent Application No. 2007-261852 filed on Oct. 5, 2007, with Japan Patent Office, the entire content of which is hereby incorporated by reference.

BACKGROUND OF THE INVENTION

1. Technical Field

The present invention relates to a controlling program to be executed in a network system so as to output audible voices indicating guidance for a user and also relates to an image forming apparatus that output the above audible voices.

2. Background of the Invention

In recent years, various kinds of image forming apparatuses, such as a copier, a printer, etc., have employed various kinds of technologies to improve usability. For instance, cited as one of such the technologies can be a voice guiding facility, to audibly announce the contents of a trouble or the like occurring within the image forming apparatus by using audible voices. According to the image forming apparatus provided with the above voice guiding facility, it becomes possible for the user to easily grasp the current status of the image forming apparatus, even if the user is apart from the installation place of the malfunctioning image forming apparatus. Further, even if the user is a visually handicapped person, it also becomes possible for the user to easily grasp the current status of the image forming apparatus as well.

Tokkaihei 11-122409 sets forth such a technology that, when a certain trouble occurs in an image forming apparatus, audible voices indicating the contents of the trouble are outputted from the speaker upon a request of the user. According to this technology, it becomes possible for the user to hear the contents of the trouble announced by the audible voices as needed, resulting in an improvement of availability of the image forming apparatus concerned.

In a typical office environment, sometimes, plural kinds of image forming apparatuses, including an image forming apparatus capable of outputting color images, another image forming apparatus capable of outputting only monochrome images, etc., are installed. Under such an office environment as abovementioned, the user selects a suitable image forming apparatus from the plural image forming apparatuses coupled to each other through a network, in order to output an image onto a paper sheet.

When a plurality of image forming apparatuses are installed into the office as abovementioned, the user, who instructed one of the plurality of image forming apparatuses to output an image through the network, does not necessary need to be within a peripheral area of the image forming apparatus concerned. Under such the office environment as abovementioned, even if a message, indicating contents of a trouble occurring in the image forming apparatus, a completion of an image outputting operation, etc., is announced via audible voice, the contents of the message cannot reach the user who instructed the image forming operation, but merely a useless voice sound would be emitted from the image forming apparatus concerned. In addition, it has been a problem that such the useless voice sound would result in noise pollution by which other users working around the image forming apparatus concerned would be irritated.

Therefore, it is required to provide a controlling program and an image forming apparatus, each of which makes it possible to output guidance by emitting an audible voice from an image forming apparatus located in the vicinity of the user who has instructed any one of other image forming apparatuses to implement a print job.

SUMMARY OF THE INVENTION

The aspects of the present invention are any one of the computer readable storage mediums and the image forming apparatus described as follows.

(1) According to a computer readable storage medium reflecting an aspect of the present invention, in a network system that includes a plurality of image forming apparatuses, which are coupled to each other through a network, and each of which comprises: a communication section to bilaterally communicate information with other image forming apparatuses; an authenticating section to authenticate whether or not a specific user resides in a peripheral area of an image forming apparatus concerned; and a voice outputting section to output guidance for the specific user by generating audible voice, a computer readable storage medium storing a computer executable program to be executed in either one of the plurality of image forming apparatuses, the program being executable by a computer to cause the computer to perform a process comprising:

making a first image forming apparatus, implement a print job instructed by the specific user;

transmitting request information to a second image forming apparatus, being another one of the plurality of image forming apparatuses, so as to request for authenticating whether or not the specific user resides in a peripheral area of the second image forming apparatus, in such a case that the guidance should be announced to the specific user who currently resides out of such a range that the first image forming apparatus can authenticate a location of the specific user by itself;

authenticating whether or not the specific user resides in the peripheral area of the second image forming apparatus that has received the request information;

making the voice outputting section of the second image forming apparatus that has detected the specific user residing within the peripheral area of the second image forming apparatus, output the guidance for the specific user by generating audible voice;

suspending the output process when a suspension command to suspend the output process is received;

judging whether or not the suspension command is given by the specific user when the suspension command is received;

after a lapse of a predetermined time period, re-authenticating whether or not the specific user resides in the peripheral area of the second image forming apparatus, in case that the judgment becomes that has the suspension command has not given by the specific user; and making the voice outputting section of the second image forming apparatus that has re-authenticated the specific user residing within the peripheral area of the second image forming apparatus, output the guidance for the specific user by generating audible voice again.

(2) According to a computer readable storage medium reflecting another aspect of the present invention, the computer readable storage medium storing a computer executable program for making a first image forming apparatus implement predetermined operations, the program being executable by a computer to cause the computer to perform a process comprising:

making the first image forming apparatus transmit request information to a second image forming apparatus so as to request for authenticating whether or not a specific user, who has instructed the first image forming apparatus to implement a print job, resides in a peripheral area of the second image forming apparatus, in such a case that guidance should be announced to the specific user who currently resides out of such a range that the first image forming apparatus can authenticate a location of the specific user by itself; and transmitting the request information to a second image forming apparatus again, in case when the first image forming apparatus receives a information that the guidance is suspended while generating audible voice, and the information concerning on the judgment that the suspension command is not given by the specific user from the second image forming apparatus.

(3) According to a computer readable storage medium reflecting still another aspect of the present invention, the computer readable storage medium storing a computer executable program for making a second image forming apparatus implement predetermined operations, the program being executable by a computer to cause the computer to perform a process comprising:

receiving request information sent from a firs image forming apparatus that is coupled to the second t image forming apparatus through a network, so as to request for authenticating whether or not a specific user resides in a peripheral area of the second image forming apparatus;

authenticating whether or not the specific user resides in the peripheral area of the second image forming apparatus;

outputting guidance for the specific user by generating an audible voice, when it is recognized in the authenticating step that the specific user resides in the peripheral area of the first image forming apparatus;

suspending the output process when a suspension command to suspend the output process is received;

judging whether or not the suspension command is given by the specific user when the suspension command is received;

after a lapse of a predetermined time period, re-authenticating whether or not the specific user resides in the peripheral area of the second image forming apparatus, in case that the judgment becomes that has the suspension command has not given by the specific user; and making the voice outputting section of the second image forming apparatus that re-output the guidance for the specific user by generating audible voice, when detected the specific user resides in the peripheral area of the second image forming apparatus by re-authenticating.

(4) According to an image forming apparatus reflecting yet another aspect of the present invention, the image forming apparatus that forms an image on a sheet, comprising:

a communication section to receive information transmitted from an external device;

an authenticating section to authenticate whether or not a specific user resides in a peripheral area of the image forming apparatus;

a voice outputting section to output guidance for a user by generating audible voice; and a controlling section to control operations to be conducted in the image forming apparatus;

wherein, when the communication section receives request information to request for authenticating whether or not the specific user resides in the peripheral area of the image forming apparatus, the controlling section controls the authenticating section so as to authenticate whether or not the specific user resides in the peripheral area of the image forming apparatus;

wherein, when the authenticating section authenticates that the specific user resides in the peripheral area of the image forming apparatus, the controlling section controls the voice outputting section to output the guidance for the specific user by generating the audible voice, wherein, when the controlling section receives a instruction that the guidance is suspended while generating audible voice, the controlling section suspends the generation of the audible voice and judges whether or not the suspension command is given by the specific user;

wherein, when the controlling section judges that the suspension command is not given by the specific user, after a lapse of a predetermined time period, the controlling section controls the authenticating section to re-authenticating whether or not the specific user resides in the peripheral area of the second image forming apparatus; and wherein, when the authenticating section authenticates that the specific user resides in the peripheral area of the image forming apparatus, the controlling section controls the voice outputting section to output the guidance for the specific user by generating the audible voice again.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE PREFERRED EMBODIMENT

Figure 1:
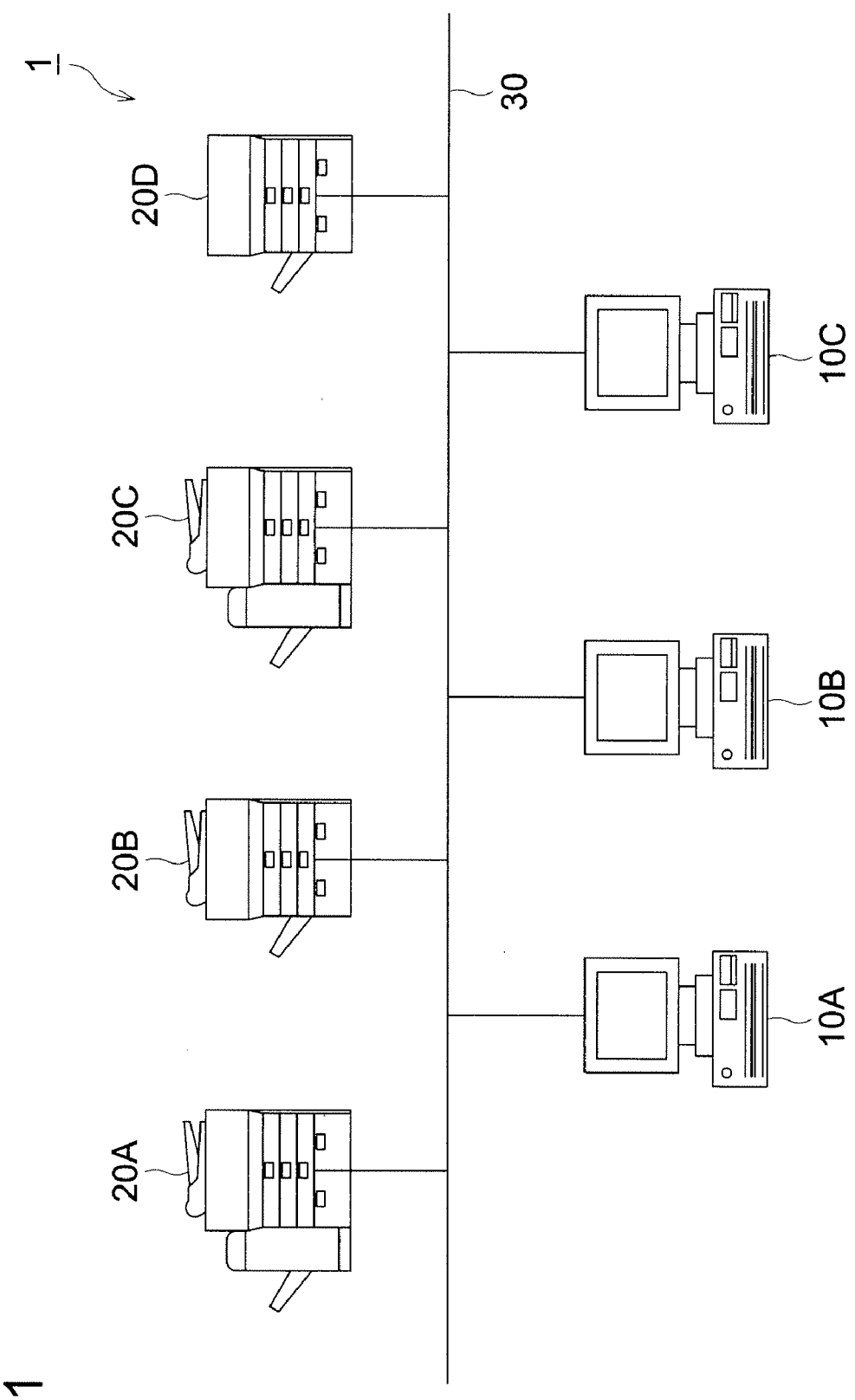
FIG. 1 shows a schematic diagram indicating a brief configuration of a network system, embodied in the present invention.

FIG. 1 shows a schematic diagram indicating a brief configuration of a network system 1.

In the network system 1 shown in FIG. 1, plural terminal devices 10A, 10B, 10C and plural image forming apparatuses 20A, 20B, 20C, 20D are coupled to each other through a LAN (Local Area Network) 30. Plural printer drivers in respect to the image forming apparatuses 20A, 20B, 20C, 20D are installed in advance into each of the terminal devices 10A, 10B, 10C, so that each of the terminal devices 10A, 10B can make each of the image forming apparatuses 20A, 20B, 20C, 20D to implement a print job through the LAN 30.

Each of the image forming apparatuses 20A, 20B, 20C is provided with a copying function, a printer function and a facsimile function, while the image forming apparatus 20D is provided with only a printer function. The image forming apparatuses 20A, 20B, 20C, 20D can bilaterally communicate various information with each other through the LAN 30. Each of the image forming apparatuses 20A, 20B, 20C, 20D is coupled to the LAN 30 through an interface in conformity with the 10Base-T or the like, and forms a color image or a monochrome image onto a paper sheet by employing, for instance, an electro-photographic method.

Further, each of the image forming apparatuses 20A, 20B, 20C, 20D is capable of outputting an audible recorded voice announcing guidance for the user. For instance, in case that a jam of a paper sheet or a toner shortage or a no toner occurs in mid-course of implementing the print job, the prerecorded voice announcing such the inconvenience is outputted from the image forming apparatus concerned. Accordingly, it is possible for the user, while using any one of the image forming apparatuses 20A, 20B, 20C, 20D, to easily realize the current status of any one of the image forming apparatuses, even if the user moves away from the image forming apparatus concerned.

The controlling programs, embodied in the present invention, are stored in each of the image forming apparatuses 20A, 20B, 20C, 20D, so that the CPU provided in each of them reads out and executes the program codes included in the controlling programs to implement the predetermined operations. Namely, each of the image forming apparatuses 20A, 20B, 20C, 20D also serves as a computer. Alternatively, it is also applicable that a control server, which stores the controlling programs therein, is coupled to the LAN 30, so that the control server can conduct the various controlling operations to be implemented on the network system 1.

In this connection, a number of terminal devices and another number of the image forming apparatuses to be coupled to the LAN 30 is not limited to those indicated in FIG. 1. Further, the scope of the image forming method to be employed in the image forming apparatuses 20A, 20B, 20C, 20D is not limited to the electro-photographic method, but shall include any kind of image forming method, such as an ink-jetting method, a thermal sublimation method, a silver halide photographic method, etc., other than the electro-photographic method.

Figure 2:
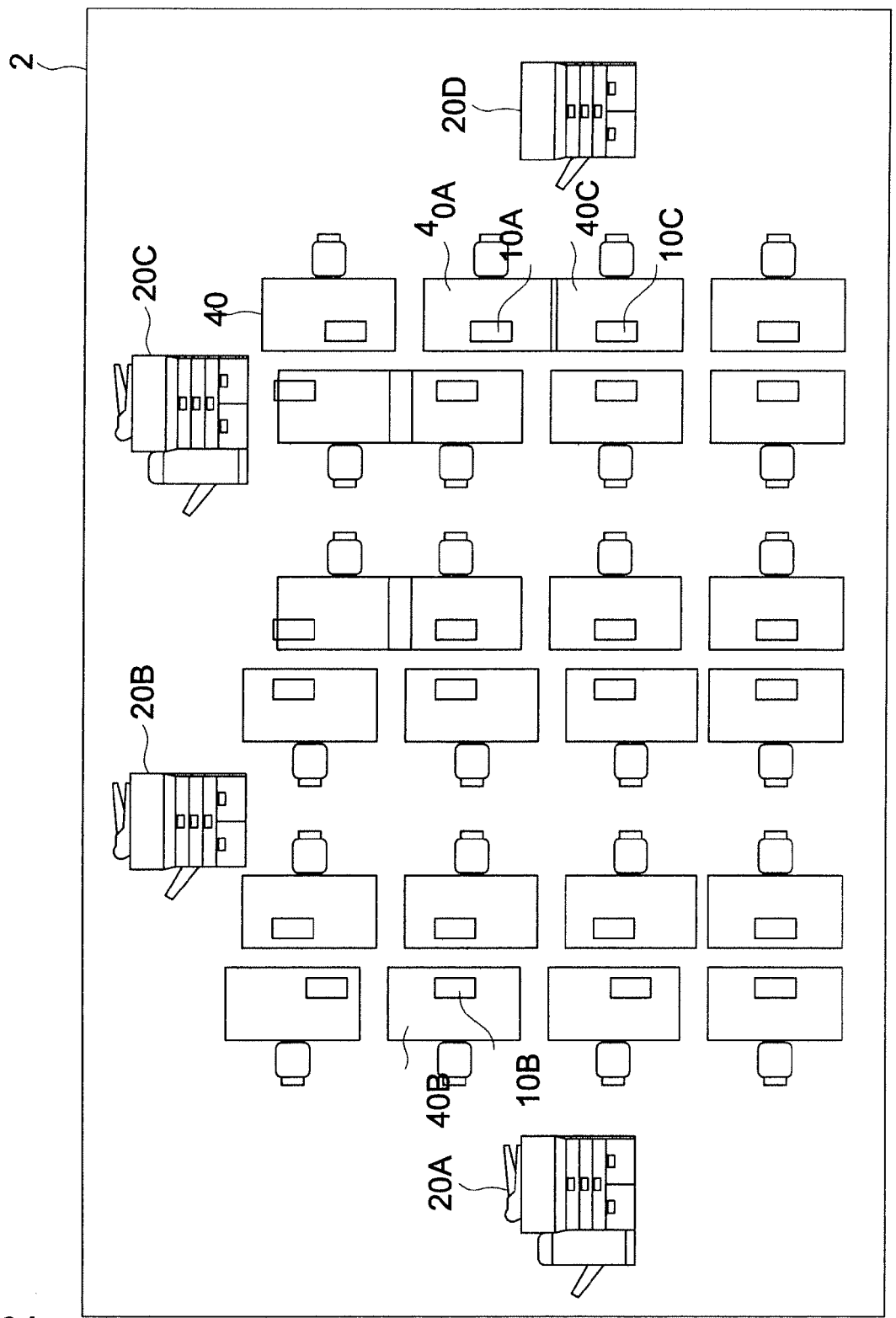
FIG. 2 shows a rough schematic diagram indicating an arrangement of plural terminal devices and plural image forming apparatuses installed in one room.
Figure 3:
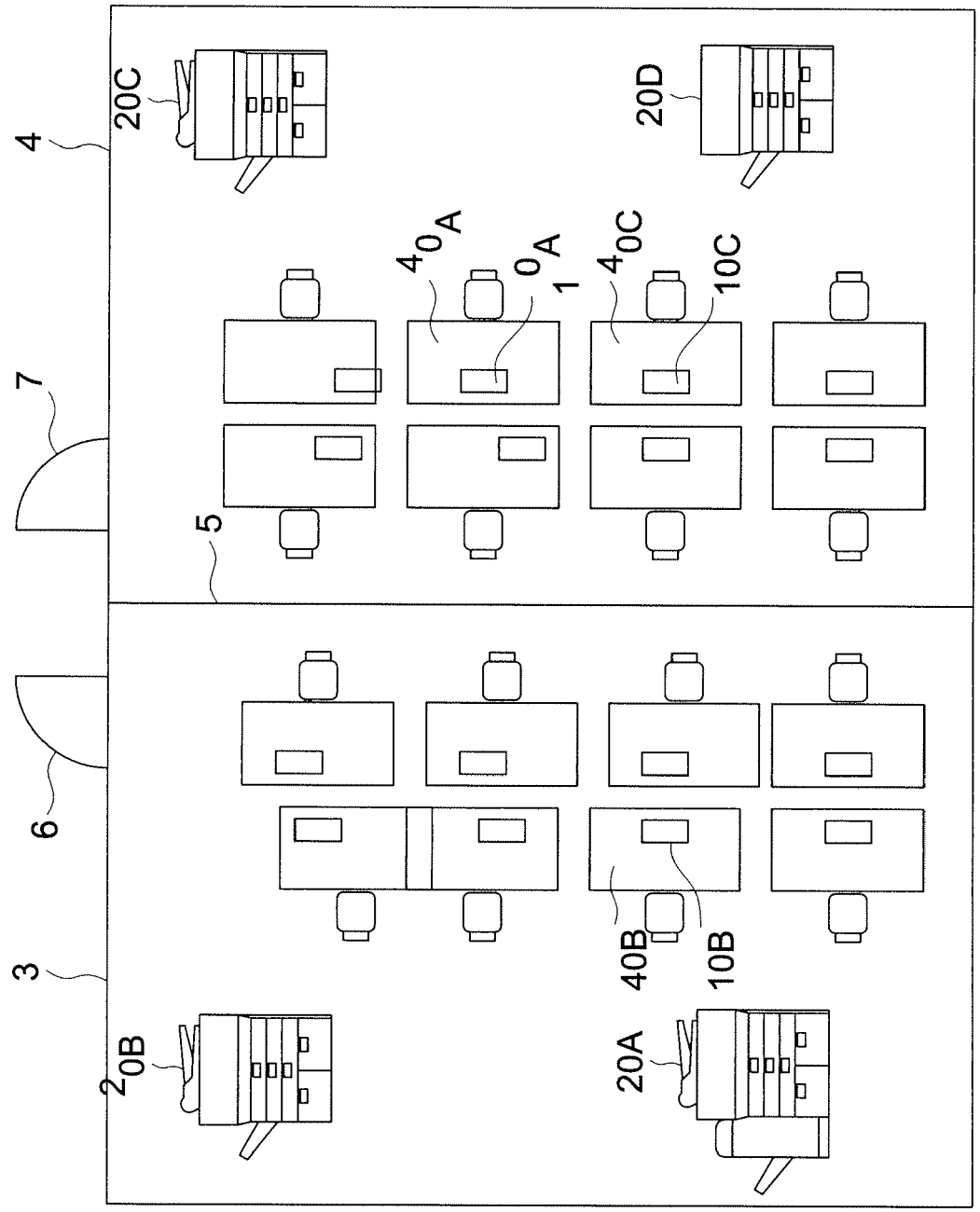
FIG. 3 shows another rough schematic diagram indicating an arrangement of plural terminal devices and plural image forming apparatuses installed in two rooms partitioned by a wall.

For instance, the network system 1 shown in FIG. 1 is utilized in a typical office environment shown in FIG. 2 or FIG. 3.

FIG. 2 shows a rough schematic diagram indicating an arrangement of plural terminal devices and plural image forming apparatuses installed in one room, while FIG. 3 shows another rough schematic diagram indicating the same in two rooms.

In an office 2 shown in FIG. 2, four sets of image forming apparatuses 20A, 20B, 20C, 20D and desks 40 to be used by 24 users are installed on a one floor. The terminal devices respectively placed on the desks 40 and the image forming apparatuses 20A, 20B, 20C, 20D are coupled to each other through the LAN 30, so as to configure the network system 1 aforementioned by referring to FIG. 1. For instance, it is possible for the user to make either the image forming apparatus 20A or the image forming apparatus 20B implement a print job based on the instruction issued by the terminal device 10A placed on a desk 40A.

On the other hand, according to the layout shown in FIG. 3, the one floor is partitioned into an office 3 and an office 4 by a wall 5, and the user can come and go between the office 3 and the office 4 through a door 6 and a door 7 In the office 3, two sets of image forming apparatuses 20A, 20B are installed, while another two sets of image forming apparatuses 20C, 20D are installed in the office 4. Although the office 3 and the office 4 are partitioned from each other by the wall 5, the terminal devices respectively placed on the desks 40 and the image forming apparatuses 20A, 20B, 20C, 20D are coupled to each other through the LAN 30, so as to configure the network system 1 aforementioned by referring to FIG. 1. For instance, it is possible for the user to make either the image forming apparatus 20A, installed in the office 3, or the image forming apparatus 20C, installed in the office 4, implement a print job based on the instruction issued by the terminal device 10A placed on the desk 40A.

Now, a case will be exemplified in which the terminal device 10A placed on the desk 40A in the office 2 instructs the image forming apparatus 20A to implement the print job, and will be further detailed in the following.

As mentioned before while referring to FIG. 1, the image forming apparatus 20A is capable of outputting the audible voice announcing an alert of guidance for the user, and accordingly, in case a problem such as a paper sheet jam occurs in mid-course of implementing a print job, the image forming apparatus 20A is capable of outputting the audible voice announcing the contents of the trouble, etc. However, since the user, who instructed the implementation of the print job concerned, is sitting at the desk 40A that is far apart from the image forming apparatus 20A, the contents of the message cannot reach the user of the terminal device 10A even if the image forming apparatus 20A announces the contents of the trouble, etc., by outputting the audible voice sound, but merely a useless voice sound is emitted from the image forming apparatus 20A. In addition, it may be a problem that such the useless voice sound results in noise pollution by which other users working around the image forming apparatus 20A are troubled.

In this case, audible voices indicating the contents of the trouble are outputted from the speaker of the image forming apparatus 20D which close to the desk 40A wherein the user is working, upon a request of the user. A user may suspend the outputting the audible voice through the operation screen of the image forming apparatus 20D, for example, because the voice guidance is noisy. No problem arises if the user having suspended the outputting is the same as the instruction user. However, if the instruction user happens to be away and another user (for example, use of the terminal 10C) has suspended the outputting the audible voice, the instruction user cannot recognize the details of the guidance and this may lead to a problem.

Even if the voice guidance has been suspended, voice guidance is resumed if the user having suspended is not the user, who instructed the implementation of the print job. This feature will be detailed in the following.

Initially, configurations of the image forming apparatus 20A, etc., will be detailed in the following.

Figure 4:
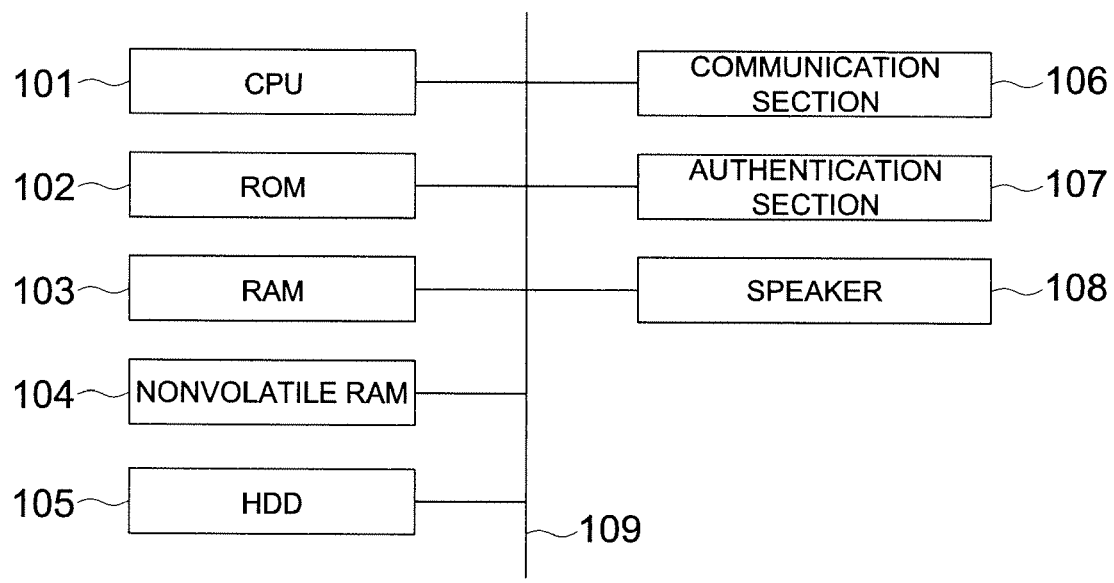
FIG. 4 shows a block diagram of a control system of an image forming apparatus embodied in the present invention.

FIG. 4 shows a block diagram of a control system of the image forming apparatus 20A, though only a typical one is indicated. Each of the other image forming apparatuses 20B, 20C, 20D has a similar configuration as that of the image forming apparatus 20A.

A CPU (Central Processing Unit) 101 is coupled to a ROM (Read Only Memory) 102, a RAM (Random Access Memory) 103, etc., through a system bus 109. The CPU 101 reads out various kinds of programs stored in the ROM 102 and develops them on the RAM 103, so as to control various kinds of operations to be conducted in each of the sections. Further, the CPU 101 implements various kinds of processing according to the programs developed on the RAM 103, and then, stores the processing results into the RAM 103 and displays the processing results on an operating panel. Successively, the CPU 101 conducts controlling operations for transferring the processing results, currently stored in the RAM 103, into the predetermined storage destination from the RAM 103. In this connection, the CPU 101 in conjunction with the ROM 102 and the RAM 103 constitutes a controlling section of the present embodiment.

The ROM 102 is typically constituted by semiconductor storage devices, so as to store, in advance, various kinds of programs, data, etc. The controlling program, embodied in the present invention, is stored in this ROM 102.

The RAM 103 forms a working area in which data, etc. processed by executing various kinds of programs in the CPU 101 are temporarily stored, therein.

A nonvolatile RAM 104 temporarily stores processed data, etc., and stores various kinds of setting data necessary for activating the image forming apparatus concerned, in such a manner that the stored data, etc. do not disappear (or are not erased) even if the power source of the image forming apparatus 20A is turned OFF.

An HDD (Hard Disc Drive) 105 stores image data read from the original document image, acquired by a scanner section, and other outputted image data, etc. The HDD 105 is constituted by a considerable number of metal discs, the surface of each of which is coated with or vapor-deposited with magnetic material, and which are superposed with each other at constant intervals, so as to make it possible to read and write data by magnetic heads approaching the metal discs while rotating the metal discs at a high velocity. Further, the HDD 105 also stores the contents of guidance for the user therein.

A communication section 106 is coupled to the LAN 30 so as to receive information, in respect to the implementation command of the print job, sent from the terminal device situated on the user's desk, and to bilaterally exchange information with the other image forming apparatuses 20B, 20C, 20D.

An authenticating section 107 determines (authenticates) whether or not a target user is located in the vicinity of (within a peripheral area of) image forming apparatus 20A. For instance, the authenticating section 107 employs a non-contacting method for conducting the operation for authenticating the user. The authenticating section 107 authenticates a user's ID based on information read from an IC card, an RF tag, an IC tip, etc., and then, authenticates which user resides within a peripheral area of image forming apparatus 20A, by comparing the read information with the user information stored in advance in the HDD 105.

A speaker 108, serving as a prerecorded voice outputting section, outputs an audible voice sound alerting or announcing guidance for the user. Concretely speaking, when the predetermined user is authenticated by the authenticating section 107, the speaker 108 is made to output the voice sound representing the predetermined alert or guidance information stored in the HDD 105, and/or the voice sound representing the guidance information received by the communication section 106.

Next, referring to the flowcharts shown in FIG. 5 through FIG. 9, operations to be conducted in the plurality of the image forming apparatuses 20A, 20B, 20C, 20D, shown in FIG. 2, will now be detailed in the following. The operations shown in FIG. 5 through FIG. 9, will be described by exemplifying the operations for transmitting information in regard to the implementation command of the print job from the terminal device 10A of the user, located at the desk 40A, to the image forming apparatus 20A, and then, implementing the transmitted print job in the image forming apparatus 20A (in this example, the image forming apparatus 20A corresponds to the first image forming apparatus, while the image forming apparatuses 20B, 20C, 20D correspond to the second image forming apparatus).

Figure 5:
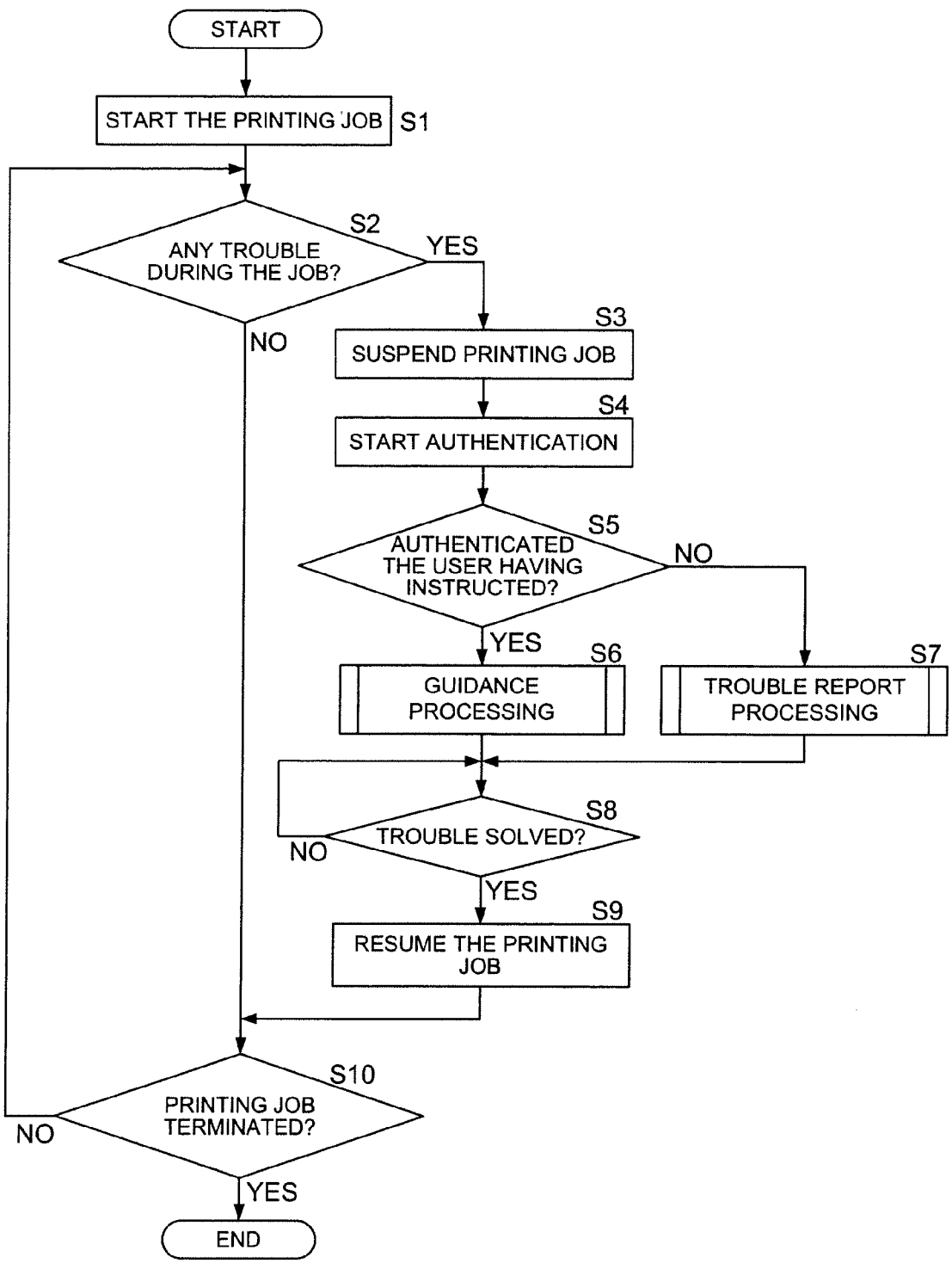
FIG. 5 shows a flowchart for explaining operations for transmitting request information in respect to a user authentication to another image forming apparatus.

FIG. 5 shows a flowchart for explaining the operations for transmitting request information in respect to the user authentication to another image forming apparatus.

At first, based on instructions sent from the terminal device 10A, the image forming apparatus 20A commences the implementation of the print job for forming an image onto a paper sheet (Step S1).

Successively, the image forming apparatus 20A determines whether or not a kind of trouble (such as a paper sheet jam, an empty toner cartridge, etc.) has happened during the implementation of the print job (Step S2).

When determining that no trouble has happened during the implementation of the print job (Step S2; No), the image forming apparatus 20A continues to implement the print job until the print job concerned is completed.

On the other hand, when determining that a kind of trouble has happened during the implementation of the print job (Step S2; Yes), the image forming apparatus 20A suspends the implementation of the print job (Step S3), and starts the authenticating operation to determine whether or not the user who instructed the image forming apparatus 20A to implement the print job concerned (hereinafter, referred to as an "instruction user"; in this connection, the instruction user also corresponds to a predetermined user) works in a peripheral area of the image forming apparatus 20A (for instance, within a range of a predetermined distance from the image forming apparatus 20A) (Step S4).

When it can be authenticated that the instruction user resides in the peripheral area of the image forming apparatus 20A (Step S5; Yes), the image forming apparatus 20A implements a guidance processing to notify the instruction user of contents of the problem by emitting an audible voice (Step S6). Detailed explanation in regard to the guidance processing will be provided later on.

On the other hand, when it cannot be authenticated that the instruction user works in the peripheral area of the image forming apparatus 20A (Step S5; No), since it is nonsense (useless) for the image forming apparatus 20A to emit an audible voice for announcing the guidance, the image forming apparatus 20A transmits information for requesting the commencement of the user authenticating operation to the other image forming apparatuses 20B, 20C, 20D, so as to authenticate whether or not the instruction user works in the peripheral area of any one of the image forming apparatuses 20B, 20C, 20D (Step S7, serving as a request information transmitting process). Details of the trouble report processing will be described later.

When the operations of Step S6 and Step S7 are completed, the image forming apparatus 20A determines whether or not the trouble, which has happened in mid-course of implementing the print job, has been resolved (Step S8). When it has been determined that the problem has been resolved (Step S8; Yes), the image forming apparatus 20A resumes the implementation of the print job concerned (Step S9).

The following describes the details of guidance processing shown in Step S6.

Figure 6:
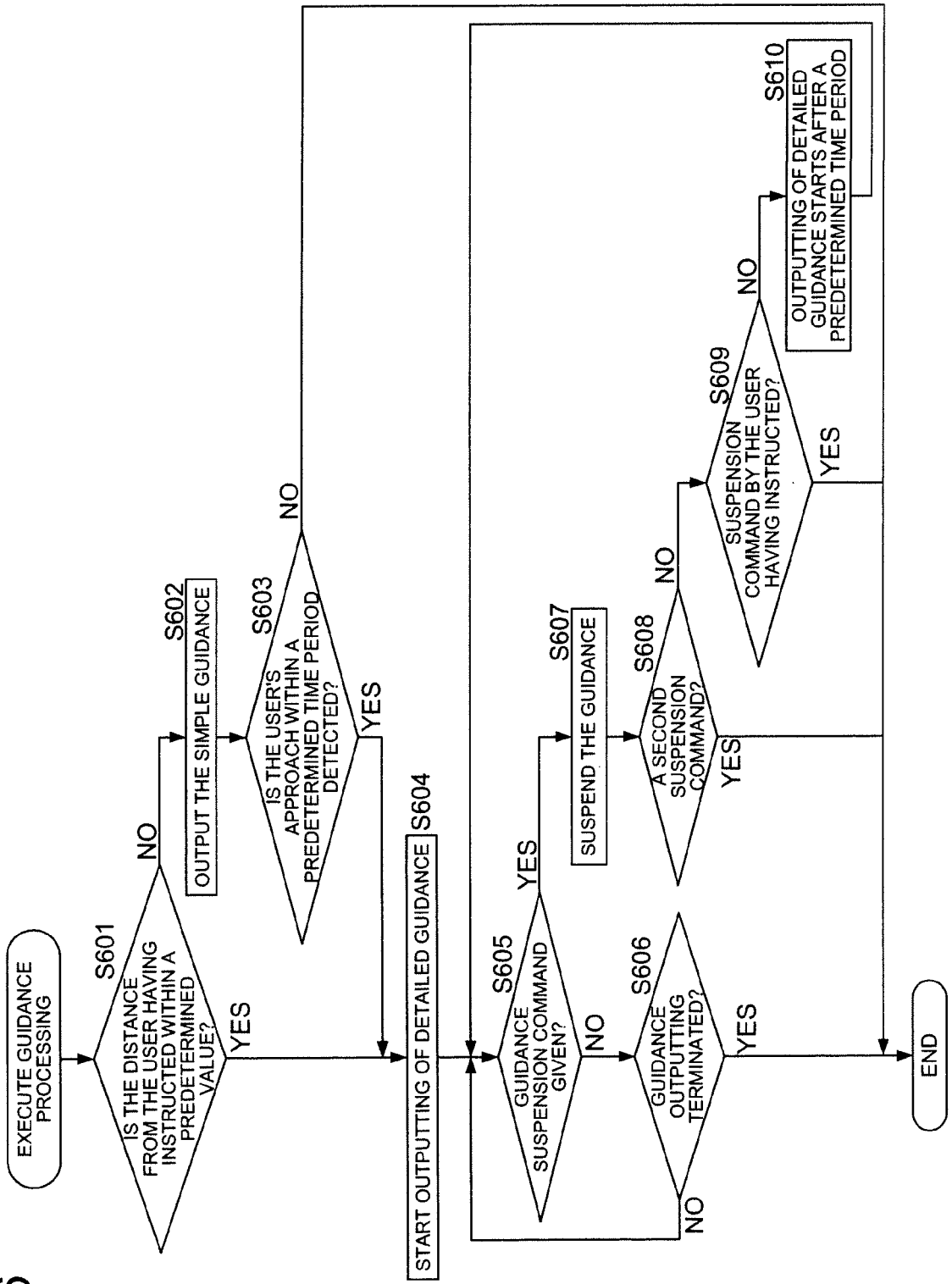
FIG. 6 shows a flowchart for indicating guidance processing operations to be conducted by the image forming apparatus.

FIG. 6 shows a flowchart for explaining the authenticating operation to be conducted in any one of other image forming apparatuses that receive the request information.

The operations indicated in FIG. 6 are to be conducted by the CPU 101 of the image forming apparatus 20A reading the program code.

In the guidance processing, initially, the image forming apparatus 20A determines whether or not the distance between the image forming apparatus concerned and the instruction user is in a range of a predetermined distance (for instance, equal to or smaller than 5 meters) (Step S601), in order to output different kinds of voice guidance corresponding to the distance between the image forming apparatus and the instruction user by emitting an audible voice.

When it has been determined that the distance between the image forming apparatus and the instruction user is in a range of the predetermined distance (Step S601; Yes), the image forming apparatus 20A outputs detailed alert or guidance (a second guidance) from the speaker (Step S604, serving as an outputting process). By hearing the detailed guidance, the instruction user can grasp the detailed current status of the image forming apparatus 20A.

For instance, the detailed guidance is such a guidance that includes a message of "Paper sheet jamming trouble has happened in the image forming apparatus located at ABC site. A paper sheet is jammed at the fixing section. Please remove the paper sheet according to the guide".

On the other hand, when it has been determined that the distance between the image forming apparatus and the instruction user is out of the range of the predetermined distance (Step S601; No), the image forming apparatus outputs simplified guidance (a first guidance) from the speaker (Step S602, serving as an outputting process). For instance, the simplified guidance is such a guidance that includes a message of "Mr. Smith! A problem has happened during the job implementation". As shown in Step S602, by outputting the simplified guidance with audible voice at first, instead of the detailed guidance, it becomes possible not only to prevent another user, working in the office 2 shown in FIG. 2, from bothering with the noisy voice sound, but also to notify the instruction user of the fact that a certain problem has occurred in the image forming apparatus 20A.

Successively, after outputting the simplified guidance, the image forming apparatus is able to detect whether or not the instruction user approaches the image forming apparatus 20A that outputted the simplified guidance within a predetermined time interval (for instance, within 10 minutes) (Step S603). According to this detecting method, the instruction user can be detected by contacting an IC-card of the instruction user onto a contacting-type sensor mounted in advance on the image forming apparatus concerned.

When it has been detected that the instruction user has approached the image forming apparatus within the predetermined time interval (Step S603; Yes), the image forming apparatus 20A outputs the audible voice of the detailed guidance (Step S604,). Accordingly, the instruction user can grasp the detailed current status of the image forming apparatus 20A. On the other hand, when it has been detected that the instruction user has not approached the image forming apparatus within the predetermined time interval (Step S603; No), the image forming apparatus finalizes the processing without outputting the detailed guidance with the audible voice.

Because the image forming apparatus 20A outputs the audible voice of the detailed guidance in Step S604, the instruction user and other users may want to suspend the outputting of detailed guidance, considering that the message of the detailed guidance is too long or having grasped the details of the trouble. In this case, a step is taken to judge whether or not there is a suspension command to suspend the guidance output while the detailed guidance is outputted (Step S605). For example, if the user has instructed the suspension command on the operation screen of the image forming apparatus 20A, the image forming apparatus 20A judges that a suspension command has been given.

In Step S605, when it has been judged that the user has not instructed guidance suspension command (Step S605: No), a step is taken to judge whether or not the outputting of the detailed guidance has been finalized (Step S606). If the outputting of the detailed guidance has finalized (Step S606: Yes), the processing finalizes.

In Step S605, when it has been judged that the user has instructed guidance suspension command (Step S605: Yes), outputting of the detailed guidance is suspended (Step S607), and a judgment is made to see whether or not this guidance suspension command is the second one (Step S608). The judgment in Step S608 is intended to eliminate the user's need of repeated suspension setting every time detailed guidance is outputted.

If the guidance suspension command is the second one in Step S608, (Step S608: Yes), a processing series finalizes. If the guidance suspension command is not the second one— namely, if it is the first suspension command—(Step S608: No), a judgment is made to see whether or not the suspension command is the one given by the instruction user (Step S609). This judgment is made by the authentication section. The user ID is authenticated according to the IC card, RF tag, IC chip, and others of the user, and is checked against the user information stored in the HDD 105, whereby the user having given the suspension command is identified.

If the suspension command is given by the instruction user (Step S609: Yes), instruction user can be assumed as grasping the details of the guidance. Thus, the current processing finalizes.

If the suspension command is not given by instruction user (Step S609: No), it has been judged that the guidance has not been identified by the instruction user. Accordingly, the instruction user must be notified again. Thus, the detailed guidance is again outputted within a predetermined time period (e.g., 15 minutes) after suspension of the guidance processing (Step S601). Then the control system goes to the operation of Step S605.

As described with reference to FIG. 6, even if the voice guidance has been suspended, the instruction user who has given the suspension command is identified. When the user other than the instruction user has given the suspension command, voice guidance is restarted. This arrangement allows the guidance to be reported to the instruction user who instructed the execution of the printing job.

The following describes the details of the trouble report processing shown with reference to Step S7.

Figure 7:
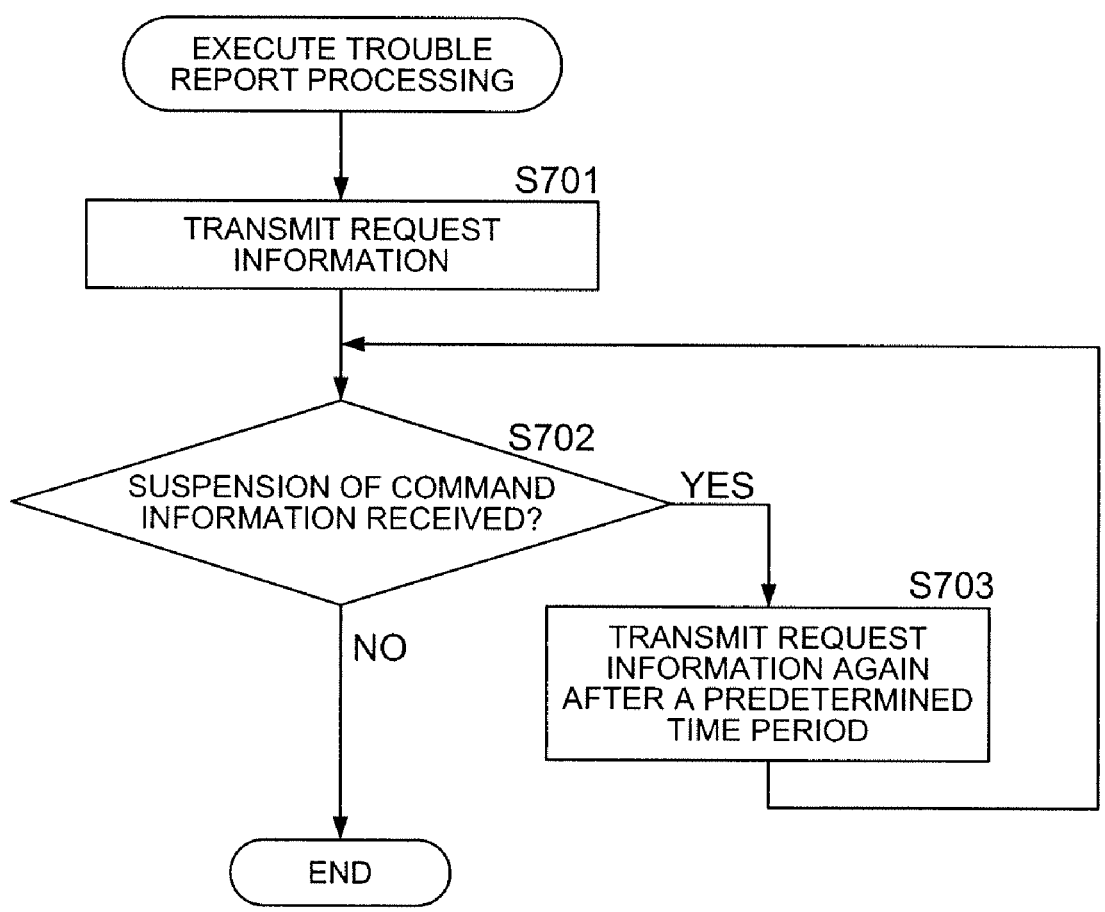
FIG. 7 shows a flowchart for the trouble report processing operation to be conducted by the image forming apparatus.

FIG. 7 shows a flowchart for the trouble report processing operation.

In trouble report processing, request information is sent from the image forming apparatus 20A to other image forming apparatuses 20B, 20C, and 20D to start user authentication and to check whether or not the instruction user resides in the peripheral area of other image forming apparatuses 20B, 20C, and 20D (transmission process in Step S701). The operations of the other image forming apparatuses 20B, 20C, and 20D having received the request information transmitted in Step S701 will be explained with reference to FIG. 8 and FIG. 9.

Figure 8:
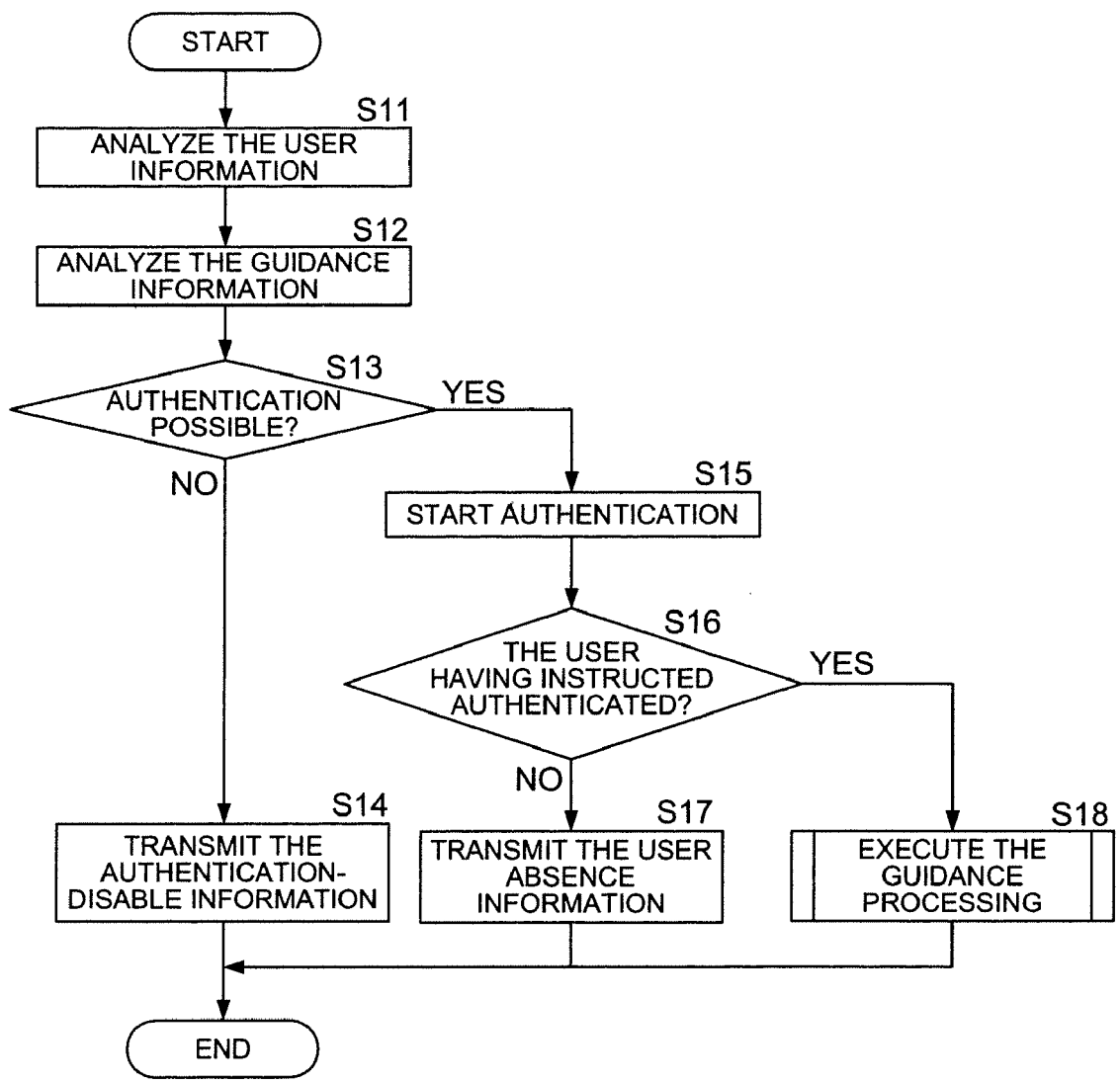
FIG. 8 shows a flowchart for explaining authenticating operations to be conducted by another image forming apparatus that receives request information.

FIG. 8 shows a flowchart for explaining authenticating operations to be conducted by another image forming apparatus that receives request information.

The operations of FIG. 8 are those of the other image forming apparatuses 20B, 20C, and 20D having received the request information in Step S701 of FIG. 7.

In the first place, upon receipt of the request information from the image forming apparatus 20A, the user information of the request information is analyzed (Step S11). Further, the guidance information of the request information is analyzed (Step S12). The analysis made in Steps S11 and S12 is intended to check whether or not the user information and guidance information stored in the HDD 105 of the image forming apparatus contains information corresponding to the user information and guidance information in the request information (wherein there is no restriction to the order of checking). Based on the analysis results of the user information and guidance information, a step is taken to determine if authentication of the instruction user is possible or not (Step S13).

If the authentication of the instruction user is not possible (Step S13: No), the information is sent to the image forming apparatus 20A to show that the instruction user cannot be authenticated (Step S14). Then the processing series finalizes.

If the instruction user can be authenticated (Step S13: Yes), authentication starts to check if the instruction user resides or not in the peripheral area of the image forming apparatuses 20B, 20C, and 20D (authentication process or re-authentication process in Steps S15 and S16).

If the presence of the instruction user cannot be authenticated (Step S16: No), the information showing that the instruction user dose not reside is send to the image forming apparatus 20A (Step S17), and the processing series finalizes. If the residence of the instruction user has been authenticated (Step S16: Yes), voice guidance processing is started to inform the instruction user of the details of the trouble in the image forming apparatus 20A (Step S18).

Figure 9:
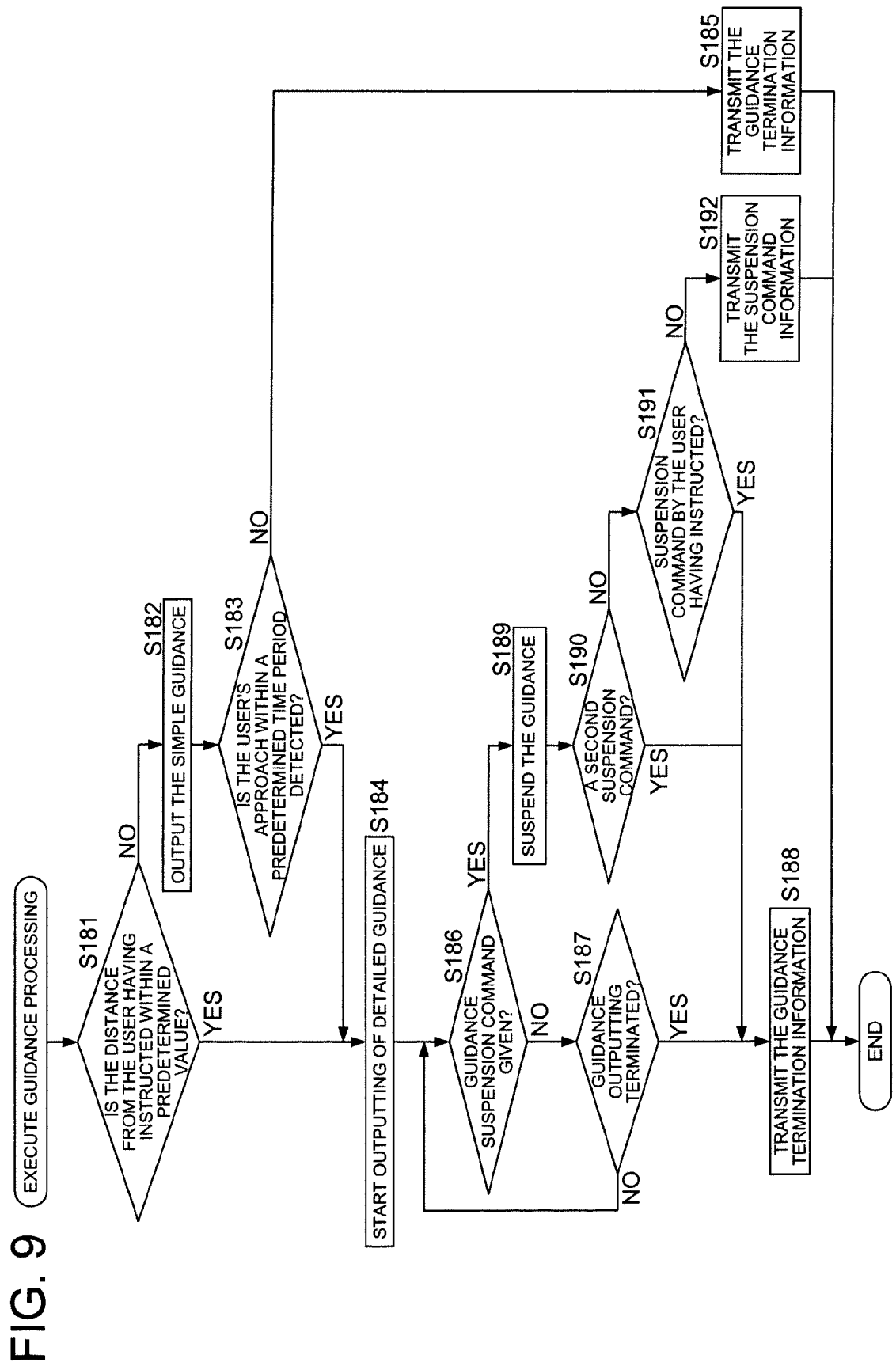
FIG. 9 shows a flowchart indicating guidance processing operations.

FIG. 9 shows a flowchart indicating guidance processing operations in Step S18 of FIG. 8. The guidance processing operations of FIG. 9 are basically the same as that of the image forming apparatus 20A (FIG. 6).

In the guidance processing, a step is taken to determine whether or not the distance between the image forming apparatus 20B and others, and the instruction user is within a predetermined level (e.g., 5 m or less) (Step S181). If the instruction user is a predetermined distance away from the image forming apparatus 20B and others, a simplified guidance (the first guidance) is outputted from a speaker 108 (output process in Step S182).

Inspection is made to check whether or not the instruction user has come close to the image forming apparatus 20B or others having outputted the simplified guidance within a predetermined time period (e.g., 10 minutes or less) after the simplified guidance has been outputted from the speaker (Step S183). If approach of the instruction user cannot be detected within a predetermined time period (Step S183: No), guidance finalization information indicating the guidance finalization is sent to the image forming apparatus 20A (Step S185) without the detailed voice guidance being outputted. Then the series of operations finalizes.

Outputting of the detailed guidance (output process) starts in Step S184. If there is no guidance suspension command in Step S186 (Step S186: No), the control system judges that outputting of the detailed guidance has finalized (Step S187) If the outputting of the detailed guidance has finalized (Step S187: Yes), the guidance finalization information indicating guidance finalization is sent to the image forming apparatus 20A (Step S188). Then the series of operations finalizes.

If there is a guidance suspension command in Step S186 (Step S186: Yes), outputting of the detailed guidance is suspended (suspension process in Step S189), and a judgment is made to see whether or not the guidance suspension command is the second one (Step S190). Similarly to the case of Step S608 in FIG. 6, the judgment in Step S190 is intended to eliminate the user's need of repeated suspension setting every time the detailed guidance is outputted.

If the guidance suspension command is the second one in Step S190 (Step S190: Yes), guidance finalization information is sent to the image forming apparatus 20A (Step S188), and the series of operations finalizes.

If the guidance suspension command is the first, not the second in Step S190 (Step S190: No), a judgment is made to see whether or not the suspension command is the one inputted by the instruction user (judging process in Step S191). This judgment is made by the authentication section. The user ID is authenticated according to the IC card, RF tag, IC chip, and others possessed by the user and is checked against the user information stored in the image forming apparatus 20B and others, whereby the instruction user who has given the suspension command is identified.

If it is judged that the suspension command has been given by the instruction user (Step S191: Yes), guidance finalization information is sent to the image forming apparatus 20A (Step S188), and the series of operations finalizes.

If the suspension command is not given by the instruction user (Step S191: No), it can be judged that the instruction user has not yet recognized the guidance. Accordingly, the instruction user must be notified again of the guidance. Thus, the image forming apparatus 20A receives the suspension command information showing that the detailed guidance has been suspended by someone other than the instruction user (judging result transmission process in Step S192). Then the series of operations finalizes.

As shown in FIG. 8 and FIG. 9, image forming apparatus 20B and others having received request information from the image forming apparatus 20A execute a series of operations and send any one of the authentication-disable information (Step S14 of FIG. 8), absence information (Step S17 of FIG. 8), guidance finalization information (Steps S185 and S188 of FIG. 9), and suspension command information (Step S192 of FIG. 9) to the image forming apparatus 20A.

Returning to FIG. 7, request information is sent in Step S701. After that, the image forming apparatus 20A verifies the information having been received from the image forming apparatus 20B and others, and checks if the suspension command information is included or not therein (Step S702).

If the image forming apparatus 20A has received the suspension command information (Step S702: Yes), the control system assumes that the residence of the instruction user has been checked by the image forming apparatus 20B and others but the trouble of the image forming apparatus 20A has not been recognized by the instruction user. Similarly to the case of Step S701, the request information is sent again within a predetermined time period after receipt of the suspension command information (re-transmission process in Step S703), and authentication is carried out to check whether or not the instruction user resides in the peripheral area of the image forming apparatuses 20B, 20C, and 20D.

The image forming apparatus 20B and others having received the request information sent in the Step S703 again execute the operations of FIG. 8 and FIG. 9. If the instruction user resides in one of the peripheral areas of the image forming apparatuses 20B, 20C, and 20D, detailed guidance is outputted (re-output process in Step S184). Further, the authentication process corresponds to the first Steps S15 and S16 of FIG. 8 and FIG. 9 to be executed by the image forming apparatus 20B and others having received the request information sent in the Step S701. The re-authentication process corresponds to Steps S15 and S16 wherein the operation of FIG. 8 and FIG. 9 is again performed by the image forming apparatus 20B and others having received the request information sent in Step S703.

The following summarizes the operations of the present invention shown in FIG. 7 through FIG. 9. If a guidance suspension command is given during detailed guidance and the suspension command has not been given by the instruction user, the information to this effect is sent to the image forming apparatus 20A. After the lapse of a predetermined time period, authentication is again performed to check whether or not the instruction user resides in the peripheral area of the image forming apparatuses 20B, 20C, and 20D. If the residence of the instruction user has been verified, the detailed guidance is again outputted to the instruction user. To be more specific, if the suspension command has not been given by the instruction user, authentication operation and guidance output operation based on this authentication operation are performed again, after the lapse of a predetermined time period.

As described above, even when the voice guidance has been suspended, the user who has given the suspension command is identified, and when a user other than the instruction user has given the suspension command, the voice guidance is again outputted. This arrangement ensures the details of the guidance to be conveyed to the instruction user who instruct the execution of the printing job.

It is to be expressly understood, however, that the present invention is not restricted to the aforementioned embodiment. The present invention can be embodied in a great number of variations with appropriate modifications or additions, without departing from the technological spirit and scope of the invention claimed.

For example, in the operation of FIG. 5, when a trouble has occurred during the printing job, the system assumes that time has come to output guidance to the user, and request information is sent to other image forming apparatuses. However, not only at the time of occurrence of a trouble but also upon completion of the printing job, request information can be sent to other image forming apparatuses to notify the finalization of the printing job.

In the operation of FIG. 6 and FIG. 9, two forms of voice guidance (detailed guidance and simplified guidance) are outputted. It is also possible to arrange such a configuration that, even when the image forming apparatus is a predetermined distance apart from the instruction user, detailed guidance is outputted without simplified guidance being outputted.

What is claimed is:

1. In a network system that includes a plurality of image forming apparatuses, which are coupled to each other through a network, and each of which comprises:
   a communication section to bilaterally communicate information with other image forming apparatuses; an authenticating section to authenticate whether or not a specific user resides in a peripheral area of an image forming apparatus concerned;
   and a voice outputting section to output guidance for the specific user by generating audible voice,
   a non-transitory computer readable storage medium storing a computer executable program to be executed in either one of the plurality of image forming apparatuses, the program being executable by a computer to cause the computer to perform a process comprising:
   making a first image forming apparatus, implement a print job instructed by the specific user;
   transmitting request information to a second image forming apparatus, being another one of the plurality of image forming apparatuses, so as to request for authenticating whether or not the specific user resides in a peripheral area of the second image forming apparatus, in such a case that the guidance should be announced to the specific user who currently resides out of such a range that the first image forming apparatus can authenticate a location of the specific user by itself;
   authenticating whether or not the specific user resides in the peripheral area of the second image forming apparatus that has received the request information;
   making the voice outputting section of the second image forming apparatus that has detected the specific user residing within the peripheral area of the second image forming apparatus, output the guidance for the specific user by generating audible voice;
   suspending the output process when a suspension command to suspend the output process is received;
   judging whether or not the suspension command is given by the specific user when the suspension command is received after a lapse of a predetermined time period, re-authenticating whether or not the specific user resides in the peripheral area of the second image forming apparatus, in case that the judgment is that the suspension command has not been given by the specific user; and
   making the voice outputting section of the second image forming apparatus that has re-authenticated the specific user residing within the peripheral area of the second image forming apparatus, output the guidance for the specific user by generating audible voice again.

2. The Non-Transitory computer readable storage medium of claim 1, wherein the process further comprises: transmitting an information of the judging result to the first image forming apparatus when the judgment that the suspension command has not been given by the specific user; after a lapse of a predetermined time period, transmitting the request information to the second image forming apparatus again when the first image forming apparatus has received the information of the judging result; and, executing re-authentication when the second image forming apparatus has received the request information.

3. The Non-Transitory computer readable storage medium of claim 1, wherein the guidance is selected from plural kinds of messages, which are different from each other, corresponding to a distance between the second image forming apparatus and the specific user authenticated by the second image forming apparatus.

4. The Non-Transitory Computer readable storage medium of claim 3, wherein, when the distance is greater than a predetermined distance, the guidance is a first guidance selected from the plural kinds of messages, while, when the distance is shorter than the predetermined distance, the guidance is a second guidance selected from the plural kinds of messages and being more detail than the first guidance.

5. The Non-Transitory Computer readable storage medium of claim 4, wherein, when it is detected that the distance is shorter than the predetermined distance after the voice outputting section of the second image forming apparatus has outputted the first guidance, the voice outputting section of the second image forming apparatus outputs the second guidance by generating the audible voice.

6. A non-transitory computer readable storage medium storing a computer executable program for making a first image forming apparatus implement predetermined operations, the program being executable by a computer to cause the computer to perform a process comprising:
   making the first image forming apparatus transmit request information to a second image forming apparatus so as to request for authenticating whether or not a specific user, who has instructed the first image forming apparatus to implement a print job, resides in a peripheral area of the second image forming apparatus, in such a case that guidance should be announced to the specific user who currently resides out of such a range that the first image forming apparatus can authenticate a location of the specific user by itself; and transmitting the request information to a second image forming apparatus again, in case when the first image forming apparatus receives an information that the guidance is suspended while generating audible voice, and the information concerning on the judgment that the suspension command is not given by the specific user from the second image forming apparatus.

7. A non-transitory computer readable storage medium storing a computer executable program for making a second image forming apparatus implement predetermined operations, the program being executable by a computer to cause the computer to perform a process comprising:

receiving request information sent from a first image forming apparatus that is coupled to the second image forming apparatus through a network, so as to request for authenticating whether or not a specific user resides in a peripheral area of the second image forming apparatus;

authenticating whether or not the specific user resides in the peripheral area of the second image forming apparatus;

outputting guidance for the specific user by generating an audible voice, when it is recognized in the authenticating step that the specific user resides in the peripheral area of the first image forming apparatus;

suspending the output process when a suspension command to suspend the output process is received;

judging whether or not the suspension command is given by the specific user when the suspension command is received;

after a lapse of a predetermined time period, re-authenticating whether or not the specific user resides in the peripheral area of the second image forming apparatus, in case that the judgment is that the suspension command has not been given by the specific user; and making the voice outputting section of the second image forming apparatus that re-output the guidance for the specific user by generating audible voice, when detected the specific user resides in the peripheral area of the second image forming apparatus by re-authenticating.

8. The non-transitory computer readable storage medium of claim 7, wherein the process further comprises:

transmitting an information of the judging result to the first image forming apparatus when the judgment is that the suspension command has not been given by the specific user;

re-receiving the request information from the first image forming apparatus; and executing re-authentication after the second image forming apparatus has received the request information.

9. The non-transitory computer readable storage medium of claim 8, wherein the guidance is selected from plural kinds of messages, which are different from each other, corresponding to a distance between the second image forming apparatus and the specific user authenticated by the second image forming apparatus.

10. The non-transitory computer readable storage medium of claim 9, wherein, when the distance is greater than a predetermined distance, the guidance is a first guidance selected from the plural kinds of messages, while, when the distance is shorter than the predetermined distance, the guidance is a second guidance selected from the plural kinds of messages and being more detail than the first guidance.

11. The non-transitory computer readable storage medium of claim 10, wherein, when it is detected that the distance is shorter than the predetermined distance after the voice outputting section of the second image forming apparatus has outputted the first guidance, the voice outputting section of the second image forming apparatus outputs the second guidance by generating the audible voice.

12. An image forming apparatus that forms an image on a sheet, comprising:

a communication section to receive information transmitted from an external device;

an authenticating section to authenticate whether or not a specific user resides in a peripheral area of the image forming apparatus;

a voice outputting section to output guidance for a user by generating audible voice; and a controlling section to control operations to be conducted in the image forming apparatus;

wherein, when the communication section receives request information to request for authenticating whether or not the specific user resides in the peripheral area of the image forming apparatus, the controlling section controls the authenticating section so as to authenticate whether or not the specific user resides in the peripheral area of the image forming apparatus;

wherein, when the authenticating section authenticates that the specific user resides in the peripheral area of the image forming apparatus, the controlling section controls the voice outputting section to output the guidance for the specific user by generating the audible voice, wherein, when the controlling section receives an instruction that the guidance is suspended while generating audible voice, the controlling section suspends the generation of the audible voice and judges whether or not the suspension command is given by the specific user;

wherein, when the controlling section judges that the suspension command is not given by the specific user, after a lapse of a predetermined time period, the controlling section controls the authenticating section to re-authenticating whether or not the specific user resides in the peripheral area of the second image forming apparatus; and wherein, when the authenticating section authenticates that the specific user resides in the peripheral area of the image forming apparatus, the controlling section controls the voice outputting section to output the guidance for the specific user by generating the audible voice again.

13. The image fanning apparatus of claim 12, wherein the guidance is selected from plural kinds of messages, which are different from each other, corresponding to a distance between the specific user and the image forming apparatus.

14. The image forming apparatus of claim 13, wherein, when the distance is greater than a predetermined distance, the guidance is a first guidance selected from the plural kinds of messages, while, when the distance is shorter than the predetermined distance, the guidance is a second guidance selected from the plural kinds of messages and being more detail than the first guidance.

15. The image forming apparatus of claim 12, wherein, when the controlling section detects that the distance is shorter than the predetermined distance after the voice outputting section has outputted the first guidance, the controlling section controls the voice outputting section to output the second guidance by generating the audible voice.

* * * * *